United States Patent [19]
Nini et al.

[11] Patent Number: 5,855,349
[45] Date of Patent: Jan. 5, 1999

[54] EASY ENTRY SEAT ADJUSTER ASSEMBLY WITH POSITION MEMORY AND IMPROVED SEAT RETURN HOLD OPEN MEANS

[75] Inventors: James Peter Nini, Clinton Township, Macomb County; Joseph Michael Heilig, Macomb; Joseph Tarry Galea, Kewadin, all of Mich.

[73] Assignee: General Motors Corporation, Detroit, Mich.

[21] Appl. No.: 876,873

[22] Filed: Jun. 16, 1997

[51] Int. Cl.$^6$ .................................................. F16M 13/00
[52] U.S. Cl. ............................................................ 248/429
[58] Field of Search ................................... 248/430, 429, 248/424; 297/341; 296/68.1, 65.1

[56] References Cited
U.S. PATENT DOCUMENTS 4,852,846  8/1989  Weier ......................................... 248/430

*Primary Examiner*—Ramon O. Ramirez
*Attorney, Agent, or Firm*—Patrick M. Griffin

[57] ABSTRACT

A manual seat adjuster with easy entry mode and position memory has an improved means to hold the spring loaded lock bar out of engagement with the locking teeth during the return trip of the front seat. At the beginning of the easy entry mode, as a rear seat entering passenger begins to slide the front seat forward, the lock bar initially rotates open, while the memory marker remains fixed in place. A window on a carrier arm rotatable with the lock bar circumferentially aligns itself with a keeper on a stationary latch, but the latch keeper is temporarily pushed to the side and out of the aligned window by engagement with a stop member on the stationary memory marker. As the seat begins to move forward, the latch moves away from the stop member and the keeper moves into the carrier window, where it can catch and hold the carrier arm to hold the lock bar open during the return trip of the front seat.

2 Claims, 7 Drawing Sheets

EASY ENTRY SEAT ADJUSTER ASSEMBLY WITH POSITION MEMORY AND IMPROVED SEAT RETURN HOLD OPEN MEANS

TECHNICAL FIELD

This invention relates generally to easy entry front seat adjusters of the type having a memory marker to "recall" the original seat adjusted position when the front seat is slid forward to allow unencumbered rear passenger entry, and specifically to such an adjuster with an improved mechanism to hold the seat adjuster latch open during the return of the original seat adjusted position.

BACKGROUND OF THE INVENTION

In two door cars with rear seating capacity, it is desirable to allow the front seats to be released from their adjusted, locked positions and slide forward freely by passengers entering the rear seats. Such an "easy entry" front seat release is most convenient if it is activated by a simple button or lever, or even by the mere action of pushing on the front seat's back rest by the entering rear passenger. However, an easy entry front seat release and slide mechanism is inconvenient for the front passenger if its use disturbs the fore and aft position to which the front seat occupant had already adjusted the front seat. Therefore, several designs exist for so called "memory mechanisms" which will maintain or "recall" the adjusted position of the front seat as it slides forward, and automatically re latch it in that original position as the front seat slides back again.

One such memory mechanism, for which the instant invention provides an improvement, is disclosed in co-assigned U.S. Pat. No. 4,852,846 issued Aug. 1, 1989 to Weier, which is incorporated herein by reference. Briefly summarized, a pair of parallel, outboard and inboard seat tracks mount the seat to the vehicle for fore and aft movement. Each track assembly has a lower channel fixed to the vehicle body floor, and a relatively movable upper channel fixed to the seat frame. A row of locking teeth on each lower channel is releasably engaged by a spring biased lock bar that freely pivots s on the upper channel, thereby latching the upper channels (and seat) to the lower channels (and floor) in any desired fore-aft position. The spring biased lock bars can be opened or unlatched either directly, by a front seat occupant while adjusting the front seat, or indirectly, by an entering rear seat occupant while pushing the front seat forward for clearance. The front seat occupant directly releases the lock bars by manually twisting a rod that is journaled to outboard upper channel, to which a direct actuator for a main lock bar, that is, the lock bar on the outboard upper channel, is keyed. The main lock bar, as it is lifted, in turn contacts and rotates a crank that is freely pivoted on the same rod to which the lock bar actuator is keyed. The crank pulls on a so called slave cable, which pulls and rotates the other lock bar out of engagement with the teeth on the other, inboard lower channel. The same crank is also independently rotatable by an easy entry cable, which is pulled by the bending forward of the front seat back or the like, and which can rotate the crank without affecting or moving the main lock bar actuator or the rod to which it is keyed. Then, instead of being lifted by the inoperative lock bar actuator, the crank catches and rotates the main lock bar, while simultaneously opening the other lock bar with the slave cable.

To assure that the front seat is returned exactly to ("remembers") its original adjusted position after the entering rear passenger allows the front seat to slide back, a memory mechanism is activated by the same seat adjuster handle. The memory mechanism consists of a releasable quick connect plate slidable along the outboard lower channel. The quick connect plate has an elongated, wear resistant slider that covers and blocks the teeth in front of the main lock bar. A memory marker pivoted to the plate and normally locked to the lower channel is released and picked up by the main lock bar actuator to move the plate along with it and drop it at the new position when the front seat position is adjusted.

When the easy entry mode is used, the plate and memory marker remain locked to the lower channel in their original position as the seat moves forward. On the forward trip of the front seat, the main lock bar is held out of the lower channel teeth and slightly away from the quick connect plate's slider by the tension in the easy entry cable and its pull on the crank. The other lock bar is held out of engagement with its lower channel teeth by tension in the slave cable. On the return trip of the front seat, when the tension in the easy entry cable and crank has been deactivated and released, the main lock bar can no longer be held out of tooth engagement by the crank. Instead, the main lock bar rotates down slightly under the force of its return spring, hitting and dragging along the slider of the now stationary quick connect plate, which provides the hold open feature. Tension remains in the slave cable to hold the other lock bar out of engagement with its lower channel teeth. When the main lock bar finally reaches the end of the quick connect plate slider, its return spring can then rotate it down and back into engagement with the outboard lower channel's teeth at the original adjusted position. The other lock bar does the same through the slave cable. A feature of the existing memory marker system that could potentially be improved is the hold open means, considering the friction and noise caused by the main lock bar dragging back along the slider.

SUMMARY OF THE INVENTION

The invention provides an improved hold open means that eliminates the slider portion of the quick connect plate.

In the preferred embodiment disclosed, a seat adjuster includes all of the existing components described above, but for the slider, and with only minor additions and changes to the existing components. A new hold open assembly serves to keep the main lock bar disengaged from the teeth during the seat return trip of the easy entry mode, maintaining a complete clearance of the lock bars from the teeth with no sliding or rubbing. The hold open assembly includes a slotted housing fixed to the top of the bracket that journals the handle and rod to the outboard track's upper channel. Contained side by side within the housing are a resilient, spring steel latch and a rigid, generally arcuate carrier arm arrayed about the same central pivot axis as the crank. The latch is fixed and stationary within the housing, but can be bent to the side and away from the otherwise adjacent carrier arm. The carrier arm can slide back and forth along its arc through the housing, and is pinned to a special extension on the lock bar, so as to be moved with and by the lock bar. A keeper on the latch can fit into a matching window through the adjacent carrier arm, so as to lock the carrier arm to the stationary latch (and thereby to the housing) when the window and protrusion are circumferentially aligned. The two do circumferentially align when, and only when, the lock bar and carrier arm have been rotated up to a disengaged position. In addition, a stop on the latch extends past the carrier arm and into abutment with an upstanding stop pin on the memory marker at all times when memory marker maintains the same axial position relative to the lock bar. The stop pin then pushes the resilient latch sideways and away from the carrier arm far enough that the latch protrusion cannot fit within, or catch in, the carrier arm window, so that the carrier arm can move freely.

During easy entry operation, as the easy entry cable is pulled, the main lock bar is pivoted up and held there by the pull of the easy entry cable and the crank, unlatching both it and the slave cabled lock bar from both lower tracks' teeth. Simultaneously, since the stop pin has not yet moved axially away from the lock bar, the latch remains pushed away from the carrier arm so that the lock bar extension to which the carrier arm is pinned can freely slide the carrier arm through the housing until the latch protrusion aligns with the carrier arm window. Then, as the seat does begin to slide forward, the lock bar, housing, latch and carrier arm all slide axially forward with the seat and away from the fixed memory marker, thereby moving the latch stop out of abutment with the upstanding stop pin. Concurrently, the flexed latch can spring back into side by side abutment with the carrier to push the latch protrusion into the carrier arm window. As the seat continues to move forward, tension in the easy entry cable alone serves to keep both lock bars open. But, as the front seat begins to slide back, tension is released in the easy entry cable and crank. Rather than hitting and dragging along a slide, the main lock bar is held open during the return trip of the front seat by virtue of the carrier arm window being caught in the fixed latch's protrusion. When the front seat again reaches its original fore-aft position, which is "held" by the fixed memory marker, the latch stop hits the upstanding memory marker stop pin once more. The latch is flexed axially to the side again, pushing the latch protrusion out of the carrier arm window, and thereby allowing both carrier arm and main lock bar to pivot back down into engagement with its lower track teeth. The slave cabled lock bar follows suit. All frictional contact and sliding noise is eliminated, since the main lock bar now no longer needs to drag along an associated slider of the quick connect plate to hold it open.

BRIEF DESCRIPTION OF THE DRAWINGS

These and other features will appear from the following written description, and from the following drawings, in which.

DESCRIPTION OF THE PREFERRED EMBODIMENT

Figure 1:
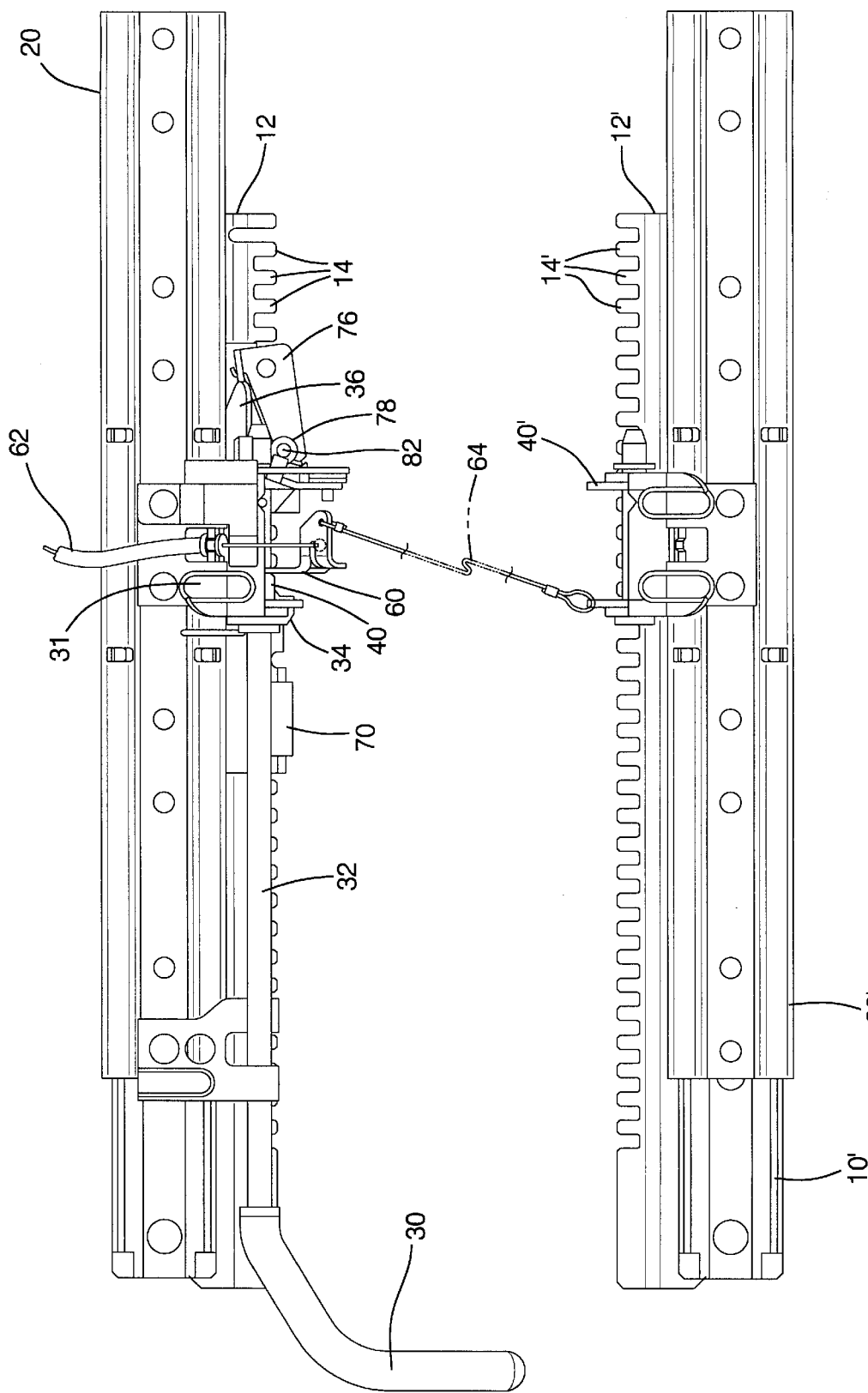
FIG. 1 is a plan view of a pair of seat tracks incorporating the seat adjuster and improved memory mechanism of the invention.
Figure 2:
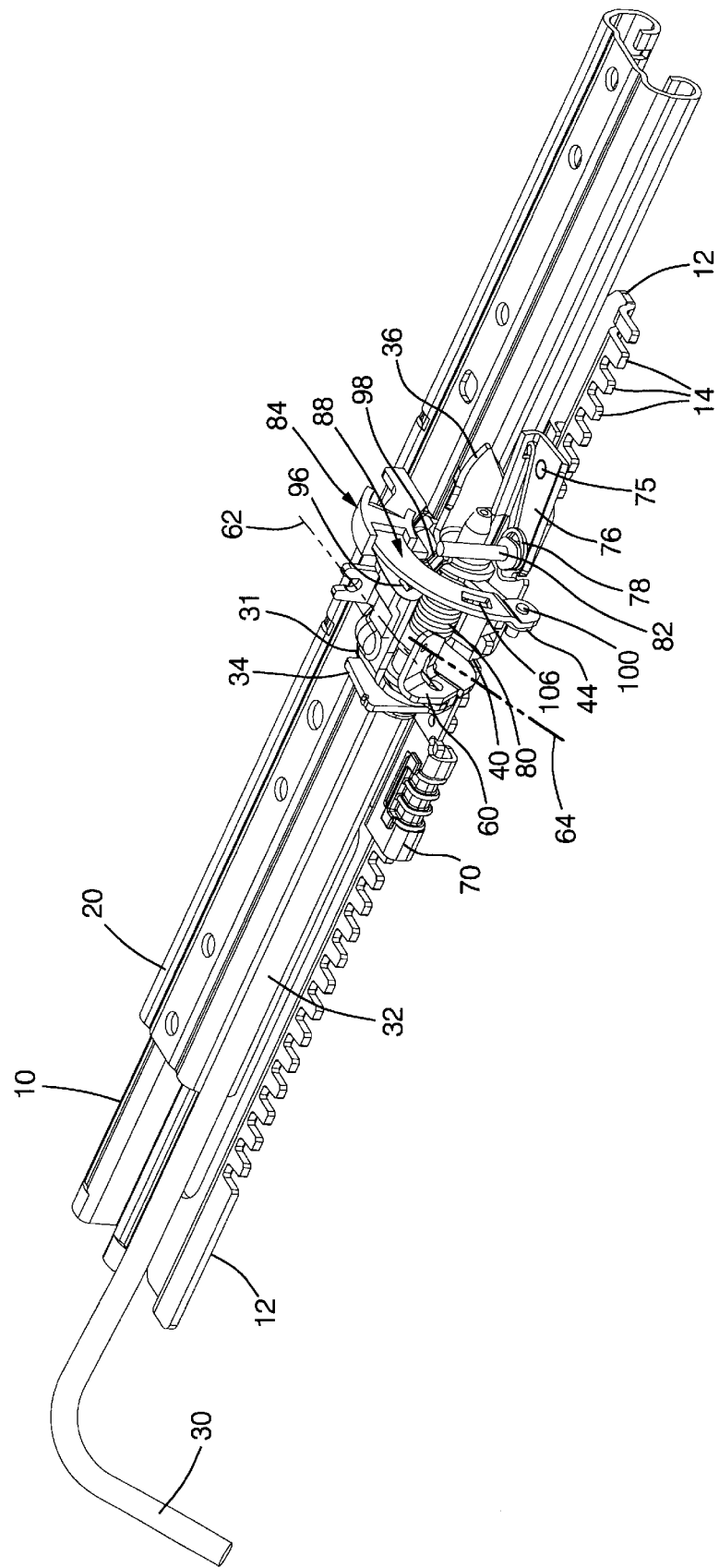
FIG. 2 is a perspective view of just the outboard seat track, the track that includes the main lock bar, in an engaged or locked position, with the main lock bar rotated down.

Referring first to FIGS. 1 and 2, most of the components in the easy entry seat adjuster assembly in which the invention is incorporated are physically, or at least functionally, identical to corresponding components in the patented design described above. In the interest of completeness, a brief description of the structure and operation of those components is repeated here, using the same numbering scheme as in the patent to assist in comparison and understanding. An outboard seat track includes a lower channel 10 fixed to the vehicle floor. Fixed beneath, or integral to, the lower channel 10 is a lock plate 12 which includes a series of teeth 14 along its edge. An outboard upper channel 20, fixed to a non illustrated seat frame, slides along outboard lower channel 10, when released by an adjuster described below, to allow the seat frame to move fore and aft relative to the vehicle. An inboard track includes identical components, given the same number primed.

Figure 14:
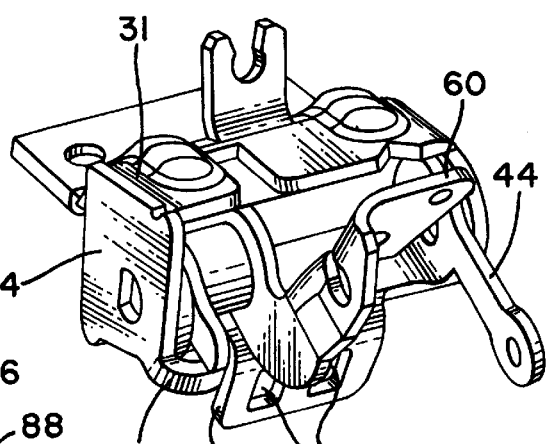
FIG. 14 adds the crank within the mounting bracket and on top of the main lock bar.

Referring next to FIGS. 1, 2 and 11 through 13, the seat adjuster includes a manual release handle 30, which has an elongated rod 32 journaled to the top of upper channel 20 with a mounting bracket 31. Rod 32 provides an axle for several components that pivot freely on it, as well as a prime mover for other components that are non rotatably fixed to it on D shaped through holes. Whether freely rotatable on or fixed to rod 32, the axis of rod 32 represents the central axis about which most of the components described rotate circumferentially, and along which (or at least parallel to which) they axially slide or move, together or apart. A main lock bar actuator 34 is non turnably fixed to rod 32, as is a scoop 36, on opposite sides of the mounting bracket 31. As best seen in FIG. 14, actuator 34 has a finger 37 that extends below one side of a main lock bar 40, which is freely pivoted on rod 32, within mounting bracket 31. Main lock bar 40 is biased to rotate down and into locking engagement, through apertures 42, with teeth 14 under the force of a strong return spring 80, thereby locking upper channel 20 to lower channel 10. When handle 30 is pulled up, it and rod 32 turn actuator finger 37 into main lock bar 40 to lift it up, against the force of spring 80, to disengage from teeth 14. Release of handle 30 allows it and lock bar 40 to both rotate back down under the force of spring 80. Unlike the patented design described above, the main lock bar 40 has an added integral extension 44 that turns with it, for a purpose described below. Another, so called slave lock bar 40' is pivoted to the inboard upper channel 20', and locks to the lower channel teeth 14' in a similar fashion. The slave lock bar 40' is activated as described next.

Referring next to FIGS. 1, 2 and 14, other components common to both the patented design described above and the subject invention cooperate to allow unlocking of both seat tracks by lifting and rotating just the main lock bar 40, either by twisting the handle 30, or independently of the handle 30, during the so called easy entry mode. A crank 60, best seen in FIG. 2, fits within the mounting bracket 31, on top of the main lock bar 40, and freely pivots on the rod 32. Therefore, if main lock bar 40 is lifted by actuator 34, it rotates crank 60 with it. A non visible notch on the back of crank 60 fits closely behind the rear edge of main lock bar 40. Therefore, if crank 60 is somehow rotated up, as seen from the perspective of FIG. 14, it also rotates the main lock bar 40 with it, and, likewise, when lock bar 40 is returned by its return spring 80, it takes crank 60 back with it. But, because of its free pivoting to rod 32, rotation of crank 60 alone does not concurrently rotate the rod 32, nor does any component keyed to the rod 32 rotate, such as the actuator 34 or scoop 36. So, in brief, actuator 34 can turn rotate crank 60, but not vice versa, while the main lock bar 40 and crank 60 each rotates the other along with it when either is rotated. Crank 60 can also be rotated and activated independently of the actuator 34 by an easy entry cable 62, which cable is tensioned and pulled by its connection to a rotating front seat back or a button or the like, not illustrated. The cable 62 is pulled when a rear passenger begins to slide the seat forward. Tension on the easy entry cable 62 will, by rotating crank 60, disengage the main lock bar 40. A so called slave cable runs from the crank 60 cross car to the slave lock bar 40'. When the main lock bar 40 is lifted by the crank 60, whether the crank 60 is lifted up by the handle 30 or pulled up by the easy entry cable 62, the consequent pull on the slave cable 64 pulls the slave lock bar 40' open simultaneously, unlocking both seat tracks to allow the seat to move forward freely. Likewise, if the slave cable 64 is released by the main lock bar 40 closing, the slave lock bar 40' closes as well.

Referring again to FIGS. 1 and 5, the distinction between the non turnable keying of actuator 34 and scoop 36 to rod 32, and the free pivoting of main lock bar 40 and crank 60 on rod 32, is used to selectively move, or leave in place, a memory or "place holding" mechanism. The memory mechanism moves to a new location whenever the seat position is adjusted fore or aft by the front seat occupant, but stays locked in place to the outboard lower channel 10 during the easy entry mode. The memory mechanism includes a quick connect plate 70 that can, when released, slide along the outboard lower channel 10. The plate 70 is releasably held to the lower channel teeth 14 by a pin 75 of a memory marker 76, which is biased to rotate inwardly by a spring 78 into and between the teeth 14. When the lock bar actuator 34 is turned by handle 30, the scoop 36 turns with it and kicks the marker 76 and pin 75 out, against the force of spring 78, freeing plate 70 to slide axially along outboard lower channel 10. A non visible tab on main lock bar actuator 34 is located so as to concurrently enter a non visible matching slot in the plate 70, just as in the patented design described above, to pick up and carry plate 70 along as the upper channel moves. When handle 30 is released, the spring 78 can relock pin 75 and plate 70 at the new adjusted position, so that marker 76 (and stop pin 82) maintain the same position relative to the main lock bar 40. During the easy entry mode, when the crank 60 is rotated by the easy entry cable 62, but the actuator 34 and rod 32 do not turn, neither does the scoop 36, and the memory marker 76 stays fixed to the lower channel 10. This allows the seat to return to that original "marked" position as described further below. Basically, the memory marking mechanism is the same as the patented design described above, but for the removal of the slider from the plate 70, and the addition of one feature. The short rod axis of the spring 78 is extended up into a stop pin 82, which serves a purpose described below. The main lock bar 40 is also the same, but for the addition of the integral extension 44. What differs from the patented design is the means for holding the main lock bar 40 open and disengaged from the teeth 14 on the return trip of the front seat in easy entry mode and then releasing it to close, and it is here that significant new components are added, described next, which work in close cooperation with the pre existing components just described.

Figure 8:
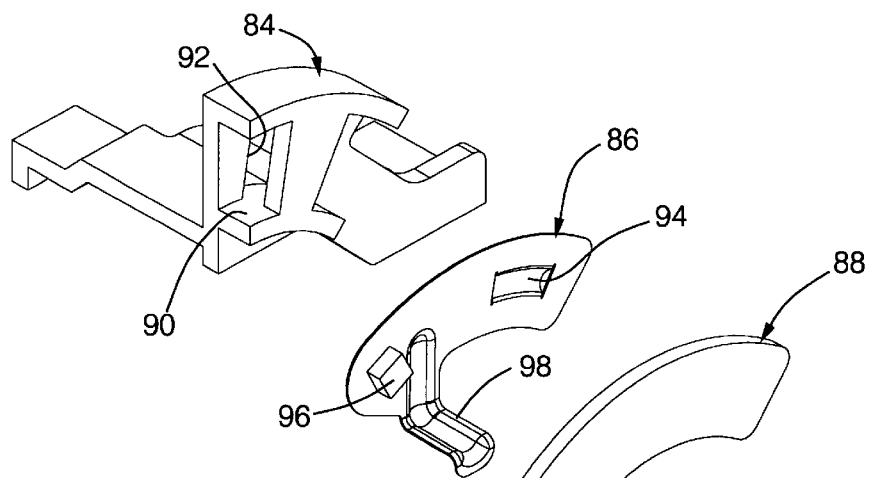
FIG. 8 is a perspective view of the housing, latch and carrier arm before they are assembled together.
Figure 9:
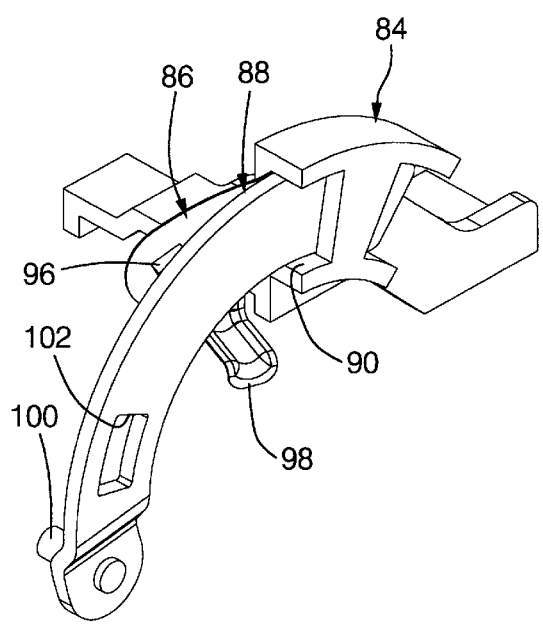
FIG. 9 shows the housing, latch and carrier arm assembled together, with the latch bent resiliently to the side and axially away from the carrier arm, corresponding to their relative position in FIG. 2.
Figure 10:
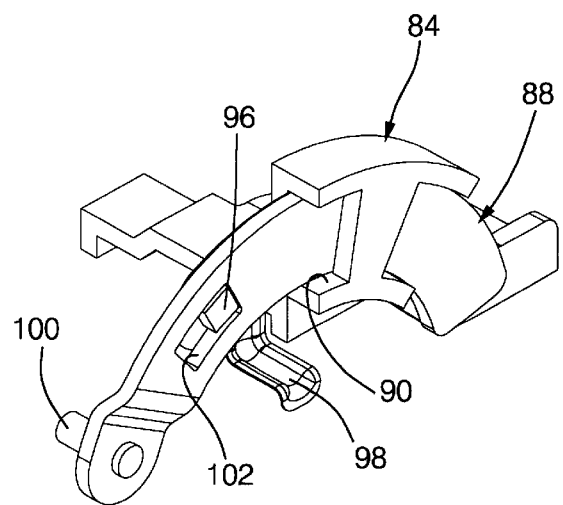
FIG. 10 is a view like FIG. 9, but showing the carrier arm caught on the latch, corresponding to their relative position in FIG. 4.
Figure 11:
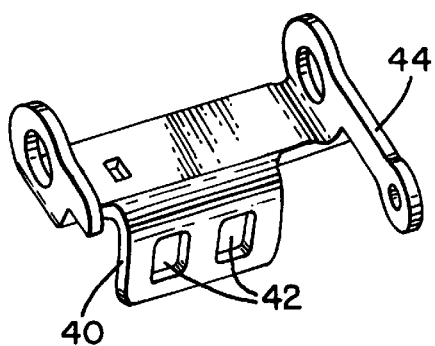
FIG. 11 is a perspective view of just the main lock bar.
Figure 12:
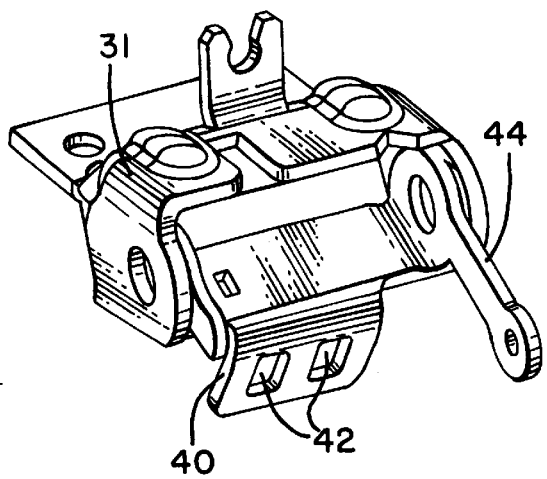
FIG. 12 is a perspective view of the main lock bar fitted within the mounting bracket that mounts the rod to the outboard seat track.
Figure 13:
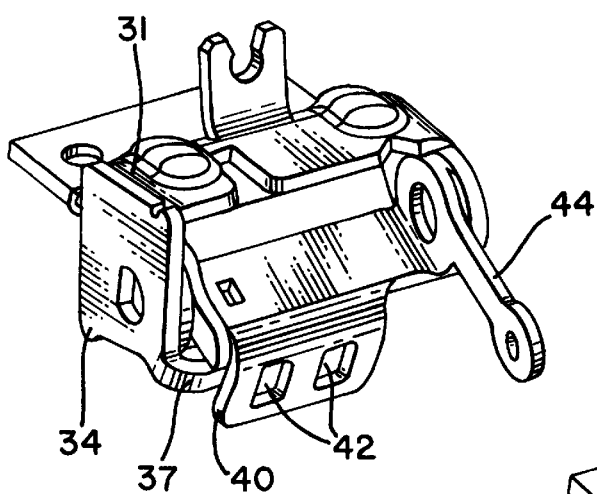
FIG. 13 shows the addition of the lock bar actuator next to the main lock bar.
Figure 15:
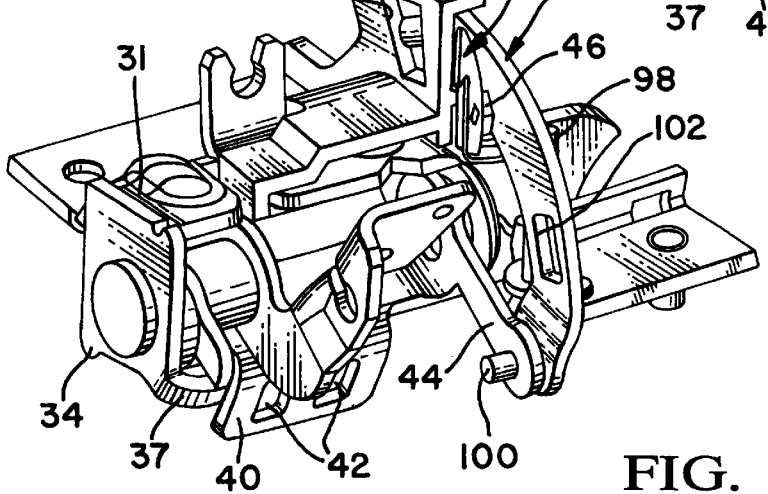
FIG. 15 shows the addition of the housing-latch-carrier arm assembly to the top of the mounting bracket, with the end of the carrier arm pinned to the end of the main lock bar extension.

Referring next to FIGS. 8 through 10, and to FIG. 15, the new return hold open means for the main lock bar 40 includes three main components, a slotted plastic housing, indicated generally at 84, a generally flat spring steel latch, indicated generally at 86, and an arcuate carrier arm, indicated generally at 88. Housing 84 has an arcuate slot 90 running through it, arrayed around the same central axis as rod 32, into which an aperture 92 opens through the back side, as best seen in FIG. 15. Spring steel latch 86 is rigid in a plane perpendicular to the central axis of rod 32, but is axially flexible side to side, along the central axis. Latch 84 includes a dimple 94 near its upper end that is sized to fit tightly into housing aperture 92, and a generally square keeper 96 protruding slightly from its flat side near the lower end, axially toward the memory marker stop pin 82. A stop 98 bent out at about ninety degrees to the body of latch 86 is located just inboard of keeper 96, and extends in the same axial direction as keeper 96, but farther, far enough to engage the stop pin 82 under conditions described below. Carrier arm 88 is generally arcuate, arrayed about the same axis as the housing slot 90, and substantially rigid in all directions. A lock bar pin 100 at the lower end of carrier arm 88 extends in a direction opposite to latch stop 98. A generally arcuate window 102, longer than, and slightly wider than, keeper 96, opens just inboard of pin 100. Latch 86 is first assembled to housing 84 by sliding it into housing slot 90 until its dimple 94 snaps into housing aperture 92, which then holds it stationary. Next, the upper end of carrier arm 88 is pushed into housing slot 90, sliding alongside latch 86, as best seen in FIG. 9. At this point, carrier arm 88 can slide freely through housing slot 90, along the latch keeper 96, which is flexed slightly to the side, until keeper 96 aligns with and snaps into carrier arm window 102, as best seen in FIG. 10. This will keep carrier arm 88 from sliding back and forth, but for the slight clearance between keeper 96 and window 102. The subassembly shown in FIG. 10 is then fastened down to the top of mounting bracket 31, as seen in FIG. 15, and carrier arm 88 is fixed to the end of lock bar extension 44 by pin 100. Operation of the return hold open mechanism is described next.

Figure 5:
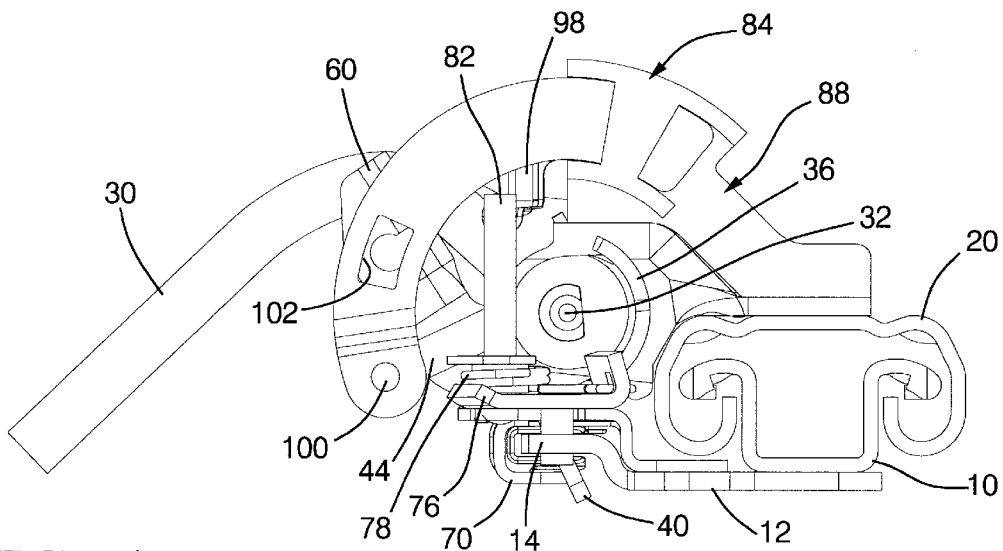
FIG. 5 is a view looking straight along the length of the outboard seat track, corresponding to FIG. 2.

Referring next to FIGS. 1, 2 and 5, when the front seat is locked in any of the possible fore-aft positions, with the memory marker 76 locked and fixed into the lower channel teeth 14, then the extended stop pin 82 hits the latch stop 98, bending latch 86 axially to the side and pushing its keeper 96 away from the side of the carrier arm 88, with no possibility of the keeper 96 axially overlapping with or catching in the window 102. The carrier arm 88 is therefore free to slide through the housing slot 90. However, carrier arm 88 doesn't move, since it is held down by the same spring 80 that holds down the main lock bar 40 and its extension 44, to which carrier arm is joined through pin 100. Although not separately illustrated, if the front seat were to be adjusted fore or aft by handle 30, then the turning rod 32 would turn both the actuator 34 and the scoop 36, so that the memory marker 76 and its pin 75 would be kicked out, and the quick connect plate 70 would be picked up by the actuator 34 to be pulled along with the freed upper channel 20. Both the memory marker 76 and its upstanding stop pin 82 would, therefore, maintain the same axial relative position to the upper channel 20, the lock bar 40, and all other associated components, even though they were all moving axially. The latch 86 would therefore remain bent to the side by the stop 98 and the abutting stop pin 82, and the carrier arm 88 could move freely through the housing slot 90 and not interfere with the rotation of the main lock bar 40 (and crank 60) by the actuator 34. The main lock bar 40 would be held open just by the rod 32 and actuator 34, and no hold open function would have to be provided by the carrier arm 88 or latch 86 at that point.

Figure 3:
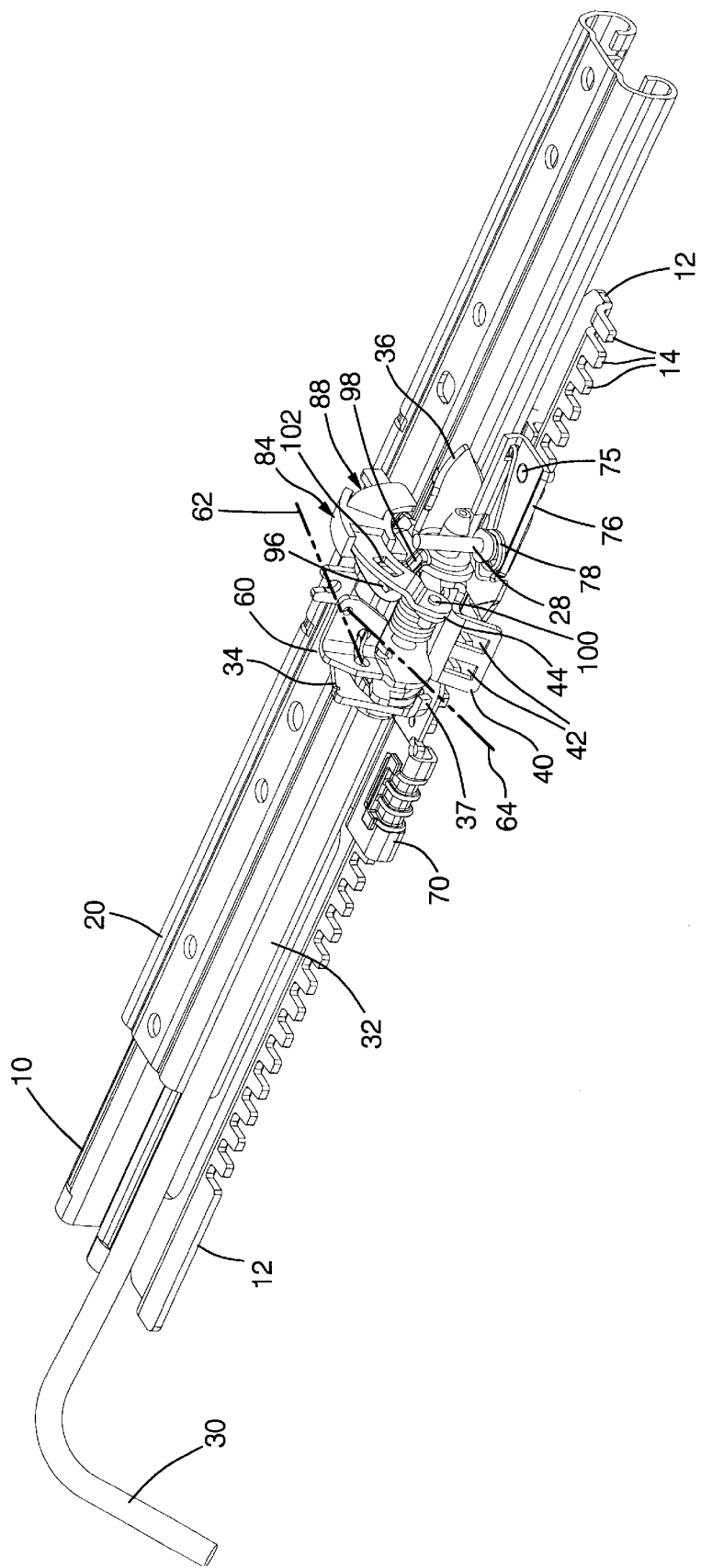
FIG. 3 is view like FIG. 2, but showing the main lock bar pulled up by the easy entry cable, but before the front seat or main lock bar has been pushed appreciably forward.
Figure 6:
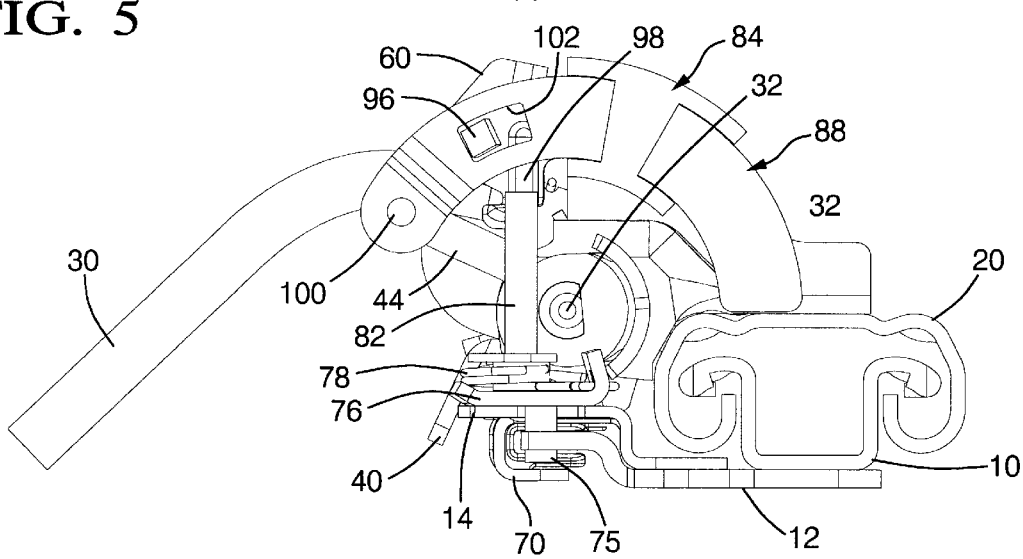
FIG. 6 is a view from the same perspective as FIG. 5, but corresponding to FIG. 3.

Referring next to FIGS. 3 and 6, when the easy entry cable 62 (shown just by a dotted line) is first pulled as described above, crank 60 and main lock bar 40 are pulled up against the force of spring 80 and released from the lower track teeth 14, while the easy entry cable 62 remains under tension. The front seat has not yet been moved forward appreciably by the entering rear passenger. Concurrently, the slave lock bar 40' is released by slave cable 64 from the inboard lower track teeth 14'. As the main lock bar 40 and its extension 44 are rotated up, out of the teeth 14, carrier arm 88 concurrently slides freely through housing slot 90, since latch 86 is still held away from the carrier arm 88 by latch stop 98 and stop pin 82. The carrier arm window 102 moves into circumferential alignment with the latch keeper 96, automatically, just from the initial rotation of crank 60 and main lock bar 40, but does not yet move axially over it with any overlap. As best seen in FIG. 6, the latch keeper 96 may rest close to the lower edge of carrier arm window 102, or somewhere near the center, but is not actually engaged with any edge thereof. Although not specifically illustrated, as the entering rear passenger next begins to slide the front seat forward, the upper channel 20, the mounting bracket 31, and all components attached to the mounting bracket 31, move forward as well. The memory marker 76 and its upstanding stop pin 82 remain fixed to the lower channel 10, however, since the rod 32 and scoop 36 have not rotated out to kick the memory marker 76 out. Therefore, the latch stop 98 moves axially away from stop pin 82, allowing latch 86 to spring back flat against the adjacent carrier arm 88. Latch keeper 96 then does move inside carrier arm window 102, but does not yet catch against the back edge of window 102, nor does it need to, on the forward motion of the front seat. This is because, on the forward motion of the upper channel 20 and mounting bracket 31, the main lock bar 40 is held up and out of the teeth 14 by the tensioned easy entry cable 62 alone, which is enough to overcome the return spring 80. Concurrently, of course, the slave lock bar 40' is held open by the slave cable 64.

Figure 4:
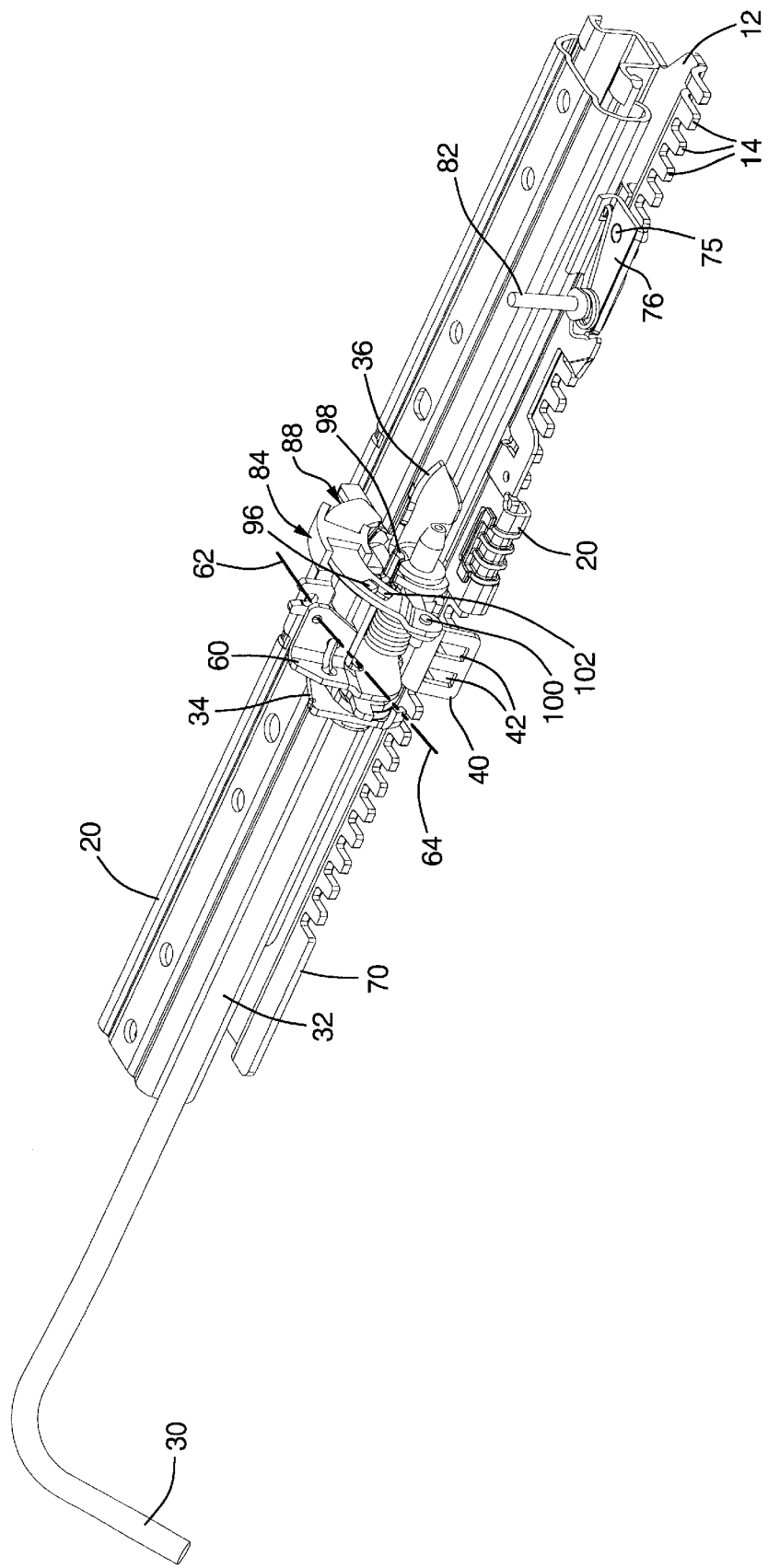
FIG. 4 is a view like FIG. 3, but showing the relationship of the latch and carrier arm while the front seat and main lock bar are returning to the original position of FIG. 2.
Figure 7:
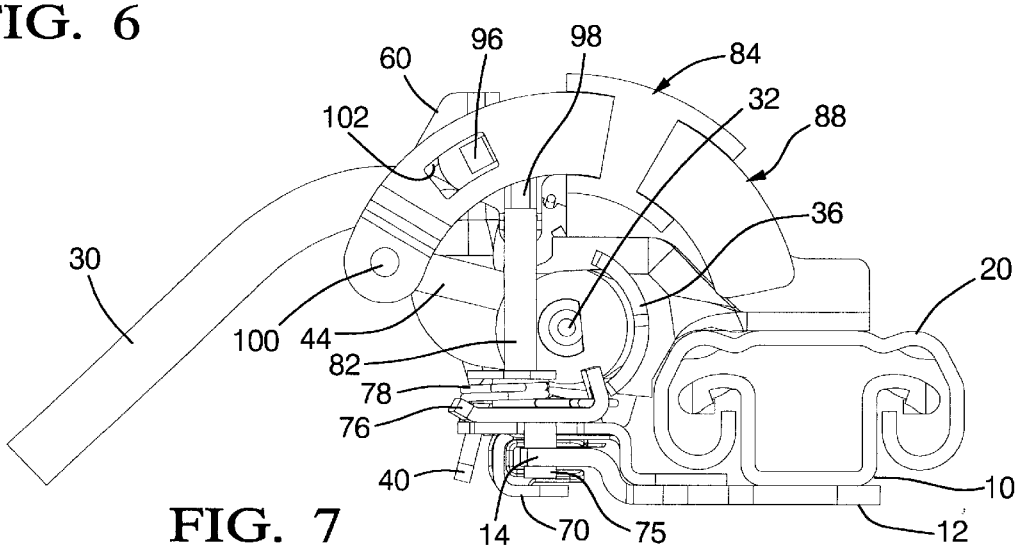
FIG. 7 is a view from the same perspective as FIG. 5, but corresponding to FIG. 4.

Referring next to FIGS. 4 and 7, as the front seat, upper channel 20, mounting bracket 31 and associated components begin to slide back with the returning front seat, the tension is released from the easy entry cable 62, which no longer serves to hold the main lock bar 40 up and out of engagement with the teeth 14. In the patented design described above, it will be recalled, it is then that the main lock bar 40 would contact and drag along the elongated slider portion of the quick connect plate 70, holding it up and out of the teeth 14 until it slid off and back into the original spot on the teeth 14 "held" by the fixed memory marker 76. Here, there is no slider portion of the quick connect plate 70. Instead, once the tension is let out of the easy entry cable 62, the crank 60, the main lock bar 40 and its extension 44 begin to rotate back down under the force of the return spring 80. Carrier arm 88 is pulled along by the pin 100. However, since the latch keeper 96 is within and axially overlapped with the edges of the carrier arm window 102, the carrier arm 88 can move down only until the back edge of window 102 hits the stationary latch keeper 96, which occurs after only a few degrees of rotation. At that point, the carrier arm 88 is held up, caught on latch 86, and the carrier arm pin 100 prevents the main lock bar extension 44, and the lock bar 40, and the crank 60, from rotating down any farther. The main lock bar 40 is held open and out of the teeth 14, and the slave lock bar 40' is concurrently held open and out of the teeth 14' by the slave cable 64, for the entire return trip of the front seat and the upper channel 20. Neither lock bar 40 or 40' contacts or drags along any other surface, eliminating the associated friction, wear and noise. When the latch stop 98 again reaches the stationary stop pin 82, it is bent to the side, away from the carrier arm 88, the keeper 96 moves out of the carrier arm window 102. The carrier arm 88, main lock bar 40, and crank 60 can all rotate back down under the force or return spring 80. The main lock bar 40 is re locked into the teeth 14 in the originally adjusted fore-aft position of upper channel 20 and the front seat. and the slave lock bar 40' follows suit through the concurrent action of crank 60 and slave cable 64.

Variations in the preferred embodiment could be made. Fundamentally, what is needed is the addition to upper channel 20 of a hold open mechanism that is operative during the return trip of upper channel 20 to prevent the main lock bar 40 from rotating back down significantly, but which does not interfere with free rotation of the main lock bar 40 as it is rotated up or down otherwise, either during the manual adjustment of the front seat, or at the beginning of the easy entry mode of front seat forward motion. Therefore, a main lock bar latch, like that provided by the spring steel latch 86 and the carrier arm 88, which is engaged during the front seat return trip, but which is disengaged otherwise, would be effective. For example, a latch that could be substituted for the spring steel latch 86 could be an axially movable resilient plunger that was pushed back by contact with a stop member on the quick connect plate 70 out of axial overlap with, disengaged from, the carrier arm 88. Then, whenever the quick connect plate 70 maintained the same physical position relative to the main lock bar 40, the latch would be disengaged. And, of course, the quick connect plate maintains that same physical position relative to the main lock bar 40 when the front seat is stationary, when it is being manually adjusted fore and aft, and at the very beginning of the easy entry motion. The interacting edges that move into or out of engagement between the stationary latch 86 and the moving carrier arm 88 need not be only a latch keeper 86 and slightly oversized carrier arm window 102. Any edge like surface of a latch that automatically moved, during the initial rotation of the main lock bar 40 at the beginning of the easy entry mode, into circumferential alignment with a catch portion of the carrier arm 88, could work. For example, a shoulder or flange on the carrier arm, which rotated into circumferential alignment with a similar edge on the latch, could then be in a position to move into axial overlap with and block any significant downward rotation movement of the carrier arm 88 during the return trip of the front seat and upper channel 20. The oversized window 102 provides the advantage of allowing some tolerance between the window edges and the keeper 96, however, so that exact circumferential alignment at the beginning of the easy entry mode rotation of crank 60 is not needed. For that matter, a more direct interaction can be imagined between a latch and an integral catch portion of the main lock bar 40. However, that might require a more drastic redesign of the existing lock bar. The great practical advantage of the subassembly of housing 84, latch 86 and carrier arm 88 is the way in which it can be easily retrofitted on top of the mounting bracket 31, with only the minor additions of the lock bar extension 44 to be pinned to the end of the carrier arm 88 and the extension of the axis of the memory marker return spring 76 into the stop pin 82. Therefore, it will be understood that it is not intended to limit the invention to just the embodiment disclosed.

We claim:

1. In combination with a seat adjuster for a vehicle seat selectively movable between a plurality of fore and aft positions and also having an easy entry mode wherein a releasable memory marker remains fixed, thereby allowing said seat to slide freely forward and return to its original position, said seat adjuster having at least one track with a lower, stationary channel and an upper, slideable channel releasably locked to said lower channel by a spring biased lock bar that rotates freely about a central axis, and in which a manually operated lock bar actuator journaled to said upper channel about said axis rotates said lock bar to an open position against its spring bias while simultaneously disconnecting said memory marker from said lower channel to move with said lock bar actuator to a new adjusted position, and in which a crank freely rotatable about said central axis is activated in easy entry mode as said seat is initially pushed forward to also rotate said lock bar to an open position independently of said manually operated lock bar actuator, and in which said crank is deactivated when said seat is returned to its original position, an improved hold open means to hold said lock bar open as said seat returns to its original position, comprising, a latch fixed to said upper channel proximate to said lock bar and having an axially movable blocking portion, a carrier arm attached to and rotatable with said lock bar about said central axis and having a catch portion that circumferentially aligns with said latch blocking portion as said lock bar is initially rotated open by said crank, and, a stop member associated with said memory marker so as to force said latch blocking portion out of axial overlap with said carrier arm catch portion whenever said memory marker maintains its same axial position relative to said lock bar, but which releases said latch blocking portion to move into axial overlap with said circumferentially aligned carrier arm catch portion when said lock bar moves axially away from said memory marker as said seat slides forward in easy entry mode, so that said latch blocking portion holds said carrier arm stationary to said latch and thereby holds said lock bar open during the return motion of said seat until said latch reengages said memory marker stop member to push said latch blocking portion out of axial overlap with said carrier arm catch portion and thereby allow said lock bar to relock to said lower channel.

2. In combination with a seat adjuster for a vehicle seat selectively movable between a plurality of fore and aft positions and also having an easy entry mode wherein a releasable memory marker remains fixed, thereby allowing said seat to slide freely forward and return to its original position, said seat adjuster having at least one track with a lower, stationary channel and an upper, slideable channel releasably locked to said lower channel by a spring biased lock bar that rotates freely about a central axis, and in which a manually operated lock bar actuator journaled to said upper channel about said axis rotates said lock bar to an open position against its spring bias while simultaneously disconnecting said memory marker from said lower channel to move with said lock bar actuator to a new adjusted position, and in which a crank freely rotatable about said central axis is activated in easy entry mode as said seat is initially pushed forward to also rotate said lock bar to an open position independently of said manually operated lock bar actuator, and in which said crank is deactivated when said seat is returned to its original position, an improved hold open means to hold said lock bar open as said seat returns to its original position, comprising, a housing fixed to said upper channel and having an arcuate slot therein arrayed about said central axis, a latch fixed to said housing and having a keeper and a stop extending in one axial direction therefrom, said latch being axially flexible, a generally arcuate carrier arm slidably received in said housing slot side by side to said latch and attached to said lock bar so as to rotate therewith through said housing slot and about said central axis, said carrier arm having a window therethrough that circumferentially aligns with said latch keeper as said lock bar is initially rotated open by said crank, and a stop member on said memory marker located so as to abut said latch stop member and flex said latch axially away from said carrier arm far enough to move said latch keeper out of said carrier arm window whenever said memory maker maintains its same axial position relative to said lock bar, but which moves axially away from said latch stop to allow said latch to flex back toward said carrier arm to move said latch keeper axially within said carrier arm window when said lock bar moves axially away from said memory marker as said seat slides forward in easy entry mode whereby said latch blocking keeper holds said carrier arm stationary to said latch and thereby holds said lock bar open during the return motion of said seat until said latch stop reengages said memory marker stop member to flex said latch away from said carrier arm and push said latch keeper out of said carrier arm window and thereby allow said look bar to relock to said lower channel.

* * * * *